C. L. BASTIAN.
FLUID PRESSURE REGULATING VALVE.
APPLICATION FILED MAY 3, 1915.
1,161,917.
Patented Nov. 30, 1915.
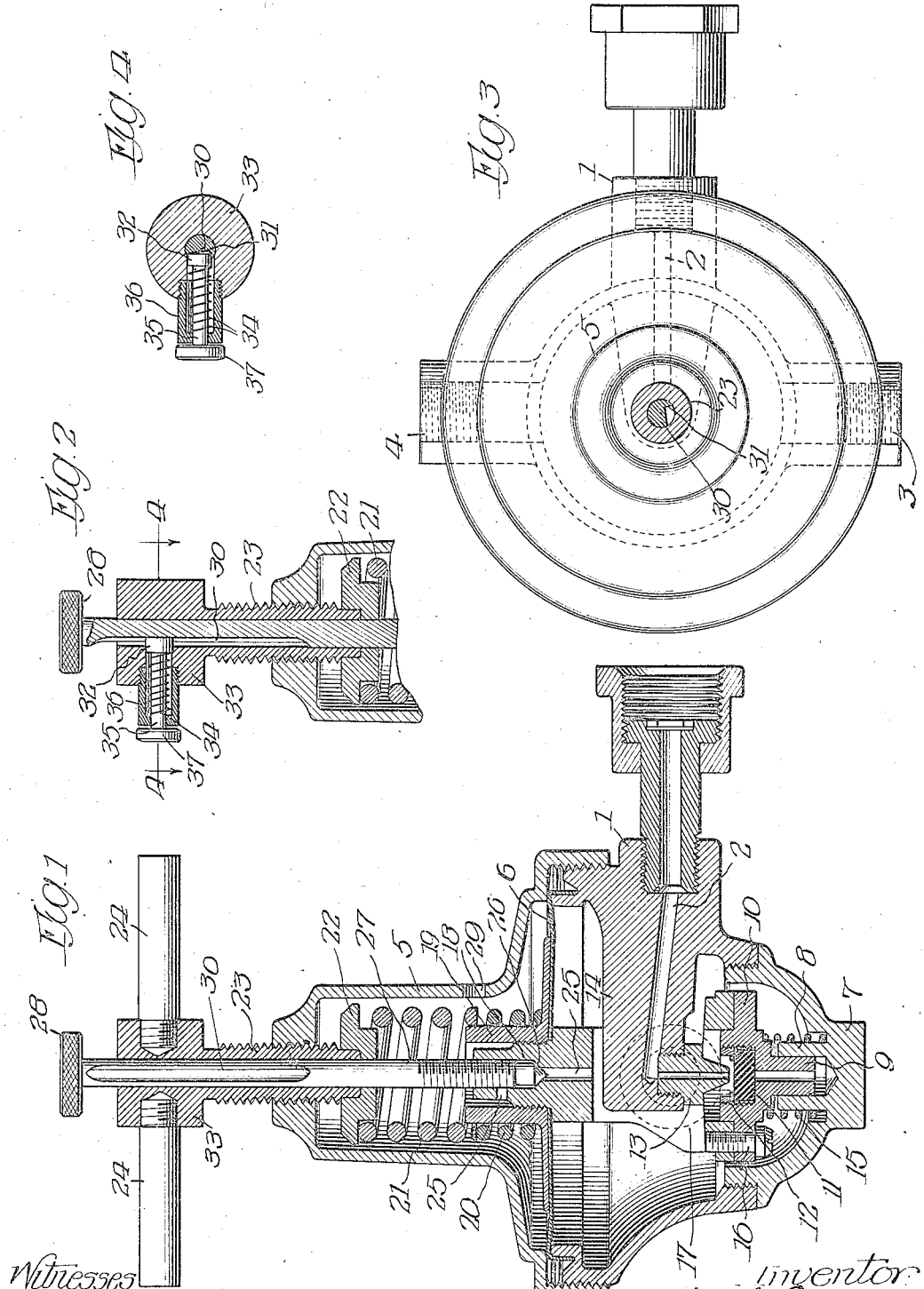

UNITED STATES PATENT OFFICE.

CHARLES L. BASTIAN, OF CHICAGO, ILLINOIS.

FLUID-PRESSURE-REGULATING VALVE.

1,161,917.  Specification of Letters Patent.  Patented Nov. 30, 1915.

Application filed May 3, 1915. Serial No. 25,366.

*To all whom it may concern:*

Be it known that I, CHARLES L. BASTIAN, a citizen of the United States, residing at Chicago, in the county of Cook and State of Illinois, have invented certain new and useful Improvements in Fluid - Pressure-Regulating Valves, of which the following is a specification.

This invention relates to fluid pressure regulating valves and more particularly to a valve for reducing and regulating the pressure of carbonic acid gas while flowing from a gas supply tank to a carbonating machine or soda-water fountain where the gas is used for charging and expelling the liquid. Valves of this character have been subject to disadvantages, among which are the difficulty of regulation to the desired pressure and frequent destruction of the valve seats when the valve is operated by inexperienced or careless persons.

It is an object of my invention to provide a pressure regulating valve which is not only sensitive in operation but which may be readily adjusted to high and low pressures and which insures the proper regulation and control of the fluid.

A further object of my invention is the provision of means whereby the fluid chamber is automatically vented to the atmosphere when the tension of the pressure sensitive valve-controlling means is reduced, whereby undue pressure on the valve seat is prevented and the possibility of injury thereto eliminated.

Other objects and advantages of my invention will be apparent as it is better understood by reference to the following specification when read in connection with the accompanying drawing in which—

Figure 1 is a vertical section through a pressure regulating valve according to my invention; Fig. 2 is a vertical section through a portion of the structure shown in Fig. 1 in a plane normal thereto; Fig. 3 is a plan view partially in section of the structure shown in Fig. 1, and Fig. 4 is a section on the line 4—4 of Fig. 2.

Referring to the drawings, the valve casing comprises a body 1 provided with an inlet 2, adapted to be connected to the source of fluid under pressure; an outlet 3 adapted to be connected to a carbonator or soda-water fountain, and an outlet 4 to which the pressure gage may be attached. A bonnet 5 is threadedly mounted on the body 1, and securely clamps a diaphragm 6 between itself and the body. A back cap 7 is threadedly secured to the body 1 and is provided with a centering member 8 formed integrally therewith and adapted to slidably support an extension 9 of the member 10, carrying a valve seat 11 of hard rubber or other suitable material, which is retained in position thereon by means of a collar 12. An inlet nozzle 13 is threadedly mounted in the bridge 14 within the casing in communication with the inlet 2, the inlet nozzle being adapted to coöperate with the valve seat 11 to prevent the flow of fluids into the chamber within the casing under conditions presently to be explained. A spring 15 surrounds the center member 8 and engages the member 10 to normally force the valve seat 11 against the end of the nozzle 13.

The member 10 is secured by means of screws 16, or in any other suitable manner, to a yoke 17, an extension 18 of which passes through the diaphragm 6, which is held in close relation therewith by a flanged collar 19 threadedly mounted on the extension 18.

A pair of springs 20 and 21 of relatively different strength are disposed in tandem within the bonnet 5 and engage the flange of the collar 19, a button 22 being disposed against the end of the spring 21 and forming a bearing for the adjusting screw 23, threadedly mounted in the end of the bonnet 5 and provided with members 24, whereby the adjusting screw may be manually operated.

The mode of operation of that portion of the valve which has been described should be apparent without further description of the structure thereof. The adjusting screw 23 is manually operated to adjust the tension of the springs 20 and 21 to a point corresponding to the desired pressure of the gas delivered from the valve. The use of a pair of springs of different strength gives greater flexibility and range to the operation of the device. The springs 20 and 21 force the diaphragm 6, and hence the yoke 17, inwardly carrying the valve seat 11 away from the inlet nozzle 13 against the action of the spring 15, and fluid is thereby allowed to enter through the inlet 2 into the chamber. As soon as the pressure of the fluid within the chamber is slightly greater than the pressure exerted by the springs 20 and 21 the diaphragm 6 will move outwardly, carrying the valve seat 11 into engagement with the inlet nozzle 13 and preventing further flow of fluid to the chamber until the pressure has been reduced by withdrawal of fluid from the chamber through the outlet 3. This operation will continue automatically so long as the valve is connected to a suitable source of fluid under pressure.

Within the extension 18 of the yoke 17 a duct 25 is formed, leading from the gas chamber to the interior of the bonnet 5 and provided with a valve seat 26 with which the needle valve 27, threadedly mounted within the extension 18, coöperates. The stem of the needle valve 27 passes through the adjusting screw 23 concentrically therewith and is provided with a knurled head 28, whereby it is manually operable to close the duct 25. A vent 29 is provided in the bonnet 5 to allow the escape of fluid therefrom when the needle valve 27 is so disposed as to open the duct 25. The stem of the needle valve 27 is provided with a slot 30, one side of which forms an abrupt shoulder 21. A dog 32 is slidably disposed in the head 33 of the adjusting screw 23 and is pressed into engagement with the stem of the needle valve 27 by a spring 34 surrounding the stem 35 of the dog 32 and bearing against shoulders formed in the head 33 of the stem 23 and a cap 36 threadedly mounted therein. The stem 35 is provided with a head 37, whereby the dog 32 may be manually withdrawn when desired.

In the normal operation of the device the needle valve 27 is disposed to close the duct 25 so that the fluid is prevented from passing therethrough. When the needle valve 27 is in position the adjusting screw 23 may be operated to increase the tension of the springs 20 and 21 without in any way affecting the needle valve. If, however, an attempt is made to reduce the tension of the springs 20 and 21 by turning the adjusting screw 23 in the opposite direction, which might result in injury to the valve seat 11 by reason of excessive pressure on the diaphragm 6, due to the fluid within the chamber, the dog 32 engages the abrupt shoulder of the groove 30 in the stem of the needle valve 27 and causes it to rotate, whereby the valve is lifted from its seat 26 and the fluid allowed to escape through the duct 25 and the vent 29 to the atmosphere. As soon as the tension of the springs 20 and 21 is sufficiently relieved the spring 15 will force the valve seat 11 against the end of the nozzle 13, cutting off the flow of fluid into the chamber.

It will be apparent from the foregoing description that I have devised an improved pressure reducing valve which overcomes the inherent defects and disadvantages of devices heretofore used for this purpose and that my valve is nevertheless of simple construction and free from parts which are liable to disarrangement, whereby the efficiency of the device would be lost. By a simple and inexpensive construction I provide means which positively prevents destruction of the valve seats, owing to careless operation of the device.

It will be apparent that various changes may be made in the form, construction and arrangement of the parts without departing from the spirit and scope of the invention, or sacrificing any of its material advantages, the form hereinbefore described being merely a preferred embodiment thereof.

I claim:

1. In a pressure regulating valve, the combination of a casing providing a chamber, a diaphragm disposed across said chamber, an inlet to and an outlet from said chamber on one side of said diaphragm, a nozzle connected to said inlet, a yoke connected to said diaphragm, a valve seat carried by said yoke and adapted to engage said nozzle to prevent the entrance of fluid into said chamber, a plurality of springs of different strength disposed in tandem within said chamber on the other side of said diaphragm and adapted to exert pressure thereon, and means for regulating the tension of said springs.

2. In a pressure regulating valve, the combination of a casing providing a chamber, an inlet to and an outlet from said chamber, pressure sensitive means for controlling the inlet to said chamber, means for varying the tension of said pressure sensitive means, and means for automatically venting said chamber when the tension of said pressure sensitive means is reduced.

3. In a pressure regulating valve, the combination of a casing providing a chamber, an inlet to and an outlet from said chamber, pressure sensitive means for controlling the inlet to said chamber, means for varying the tension of said pressure sensitive means, a vent from said chamber, means for closing said vent, and means for automatically actuating said closing means to open said vent when the tension of said pressure sensitive means is reduced.

4. In a pressure regulating valve, the combination of a casing providing a chamber, an inlet to and an outlet from said chamber, pressure sensitive means for controlling the inlet to said chamber, means for varying the tension of said pressure sensitive means, a vent from said chamber, manually operable means for closing said vent, and means for automatically actuating said closing means to open said vent when the tension of said pressure sensitive means is reduced.

5. In a pressure regulating valve, the combination of a casing providing a chamber, an inlet to and an outlet from said chamber, pressure sensitive means for controlling the inlet to said chamber, manually operable means for varying the tension of said pressure sensitive means, a vent from said chamber, manually operable means for closing said vent, and means allowing said closing means to operate freely in one direction during the closing operation and automatically actuating said closing means in the opposite direction to open said vent when the tension of said pressure sensitive means is reduced.

6. In a pressure regulating valve, the combination of a casing providing a chamber, an inlet to and an outlet from said chamber, pressure sensitive means for controlling the inlet to said chamber, manually operable means for varying the tension of said pressure sensitive means, a vent from said chamber, manually operable means arranged concentrically with said tension-varying means and freely movable longitudinally thereof for closing said vent, and a dog mounted in one of said manually operable means and operatively engaging the other, whereby said vent-closing means is freely movable to closing position and automatically actuated to open said vent when said tension-varying means is operated to reduce the tension of said pressure sensitive means.

7. In a pressure regulating valve, the combination of a casing providing a chamber, an inlet to and an outlet from said chamber, pressure sensitive means for controlling the inlet to said chamber, manually operable means for varying the tension of said pressure sensitive means, a vent from said chamber, manually operable means for closing said vent arranged concentrically within said tension-varying means and provided with a groove, and a spring-actuated dog mounted in said tension-varying means and engaging said groove, whereby said vent-closing means is freely movable to closing position and automatically actuated to open said vent when said tension-varying means is operated to reduce the tension of said pressure sensitive means.

8. In a pressure regulating valve, the combination of a casing providing a chamber, a diaphragm disposed across said chamber, an inlet to and an outlet from said chamber on one side of said diaphragm, an inlet nozzle connected to said inlet, a yoke secured to said diaphragm and provided with a valve seat adapted to engage said inlet nozzle to prevent the entrance of fluids into said chamber, a spring engaging said diaphragm, a member threadedly mounted in said casing and adapted to vary the tension of said spring, a venting duct to allow fluids to pass the diaphragm, a vent from said casing above said diaphragm, a valve for closing said duct, provided with an elongated stem disposed concentrically within said member, a slot in said stem, and a spring-actuated dog on said member and adapted to engage said slot, whereby said stem is freely rotatable to close said duct and automatically actuated by said member to open said duct, when operated to reduce the tension of said spring.

9. In a pressure regulating valve, the combination of a casing providing a chamber, a diaphragm disposed across said chamber, an inlet to and an outlet from said chamber on one side of said diaphragm, an inlet nozzle connected to said inlet, a yoke secured to said diaphragm and provided with a valve seat adapted to engage said inlet nozzle to prevent the entrance of fluids into said chamber, a pair of springs arranged in tandem, engaging said diaphragm, a member threadedly mounted in said casing and adapted to vary the tension of said spring, a venting duct to allow fluids to pass the diaphragm, a vent from said casing above said diaphragm, a valve for closing said duct, provided with an elongated stem disposed concentrically within said member, a slot in said stem, and a spring-actuated dog on said member and adapted to engage said slot, whereby said stem is freely rotatable to close said vent and automatically actuated by said member to open said duct, when operated to reduce the tension of said springs.

CHARLES L. BASTIAN.

Witnesses:
WILLIAM F. BELT,
M. A. KIDDIE.